(12) United States Patent
Kikuchi et al.

(10) Patent No.: US 8,488,068 B2
(45) Date of Patent: Jul. 16, 2013

(54) ELECTRONIC APPARATUS AND METHOD FOR ASSISTING IN REMOTE CONTROL

(75) Inventors: Masaaki Kikuchi, Akishima (JP);
Yoshihiro Ohmori, Ome (JP);
Yasukazu Higuchi, Kawasaki (JP);
Toyokazu Itakura, Kawasaki (JP);
Yuuichi Togashi, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/100,866

(22) Filed: May 4, 2011

(65) Prior Publication Data

US 2012/0026411 A1    Feb. 2, 2012

(30) Foreign Application Priority Data

Jul. 27, 2010   (JP) ................. 2010-168525

(51) Int. Cl.
*H04N 5/44*   (2006.01)
(52) U.S. Cl.
USPC ...... 348/734; 348/552; 348/14.05; 348/14.04
(58) Field of Classification Search
USPC ... 348/734, 14.05, 14.04, 14.09, 552; 725/81, 725/80, 133; 340/426.13, 4.42, 4.61, 4.62
See application file for complete search history.

(56) References Cited

U.S. PATENT DOCUMENTS

| | | | |
|---|---|---|---|
| 7,428,023 B2 * | 9/2008 | Allen et al. ................... | 348/734 |
| 2002/0122076 A1 | 9/2002 | Nakaki | |
| 2004/0257602 A1 | 12/2004 | Konuma et al. | |

FOREIGN PATENT DOCUMENTS

| | | |
|---|---|---|
| JP | 04084596 | 3/1992 |
| JP | 2000-197162 | 7/2000 |
| JP | 2001-022493 | 1/2001 |
| JP | 2001-095051 | 4/2001 |
| JP | 2002-509669 | 3/2002 |
| JP | 2002-152860 | 5/2002 |
| JP | 2002-259010 | 9/2002 |
| JP | 2004-186826 | 7/2004 |
| JP | 2004-287702 | 10/2004 |
| JP | 2005-012322 | 1/2005 |
| JP | 2005-020650 | 1/2005 |
| JP | 2006-094119 | 4/2006 |

(Continued)

OTHER PUBLICATIONS

Japanese Patent Application No. 2010-168525; Notice of Reasons for Rejection; Mailed Jul. 6, 2011 (English translation).
Japanese Patent Application No. 2011-234811, First Office Action, mailed Sep. 4, 2012, (with English Translation).

(Continued)

*Primary Examiner* — Jefferey Harold
*Assistant Examiner* — Jean W Desir
(74) *Attorney, Agent, or Firm* — Blakely, Sokoloff, Taylor & Zafman LLP

(57) ABSTRACT

According to one embodiment, an electronic apparatus includes a display controller, a communication module and a determination module. The display controller is configured to display an operation screen, which is used for operating another electronic apparatus, on a display. The communication module is configured to transmit an operation signal, which indicates an operation in accordance with the operation screen, to the another electronic apparatus. The determination module is configured to determine that a function of the another electronic apparatus is activated in response to transmission of the operation signal. The display controller includes an object generation module configured to generate an object representing an operation button for activating a function of the another electronic apparatus with one operation and to arrange the generated object on the operation screen, when the determination module determines that the function is activated through a plurality of operations.

11 Claims, 9 Drawing Sheets

FOREIGN PATENT DOCUMENTS

| | | |
|---|---|---|
| JP | 2006-260404 | 9/2006 |
| JP | 2007-258942 | 10/2007 |
| JP | 2008-033618 | 2/2008 |
| WO | 98/59284 | 12/1998 |

OTHER PUBLICATIONS

Japanese Patent Application No. 2011-234811, Decision of Rejection, mailed Dec. 4, 2012, (with English Translation).

* cited by examiner

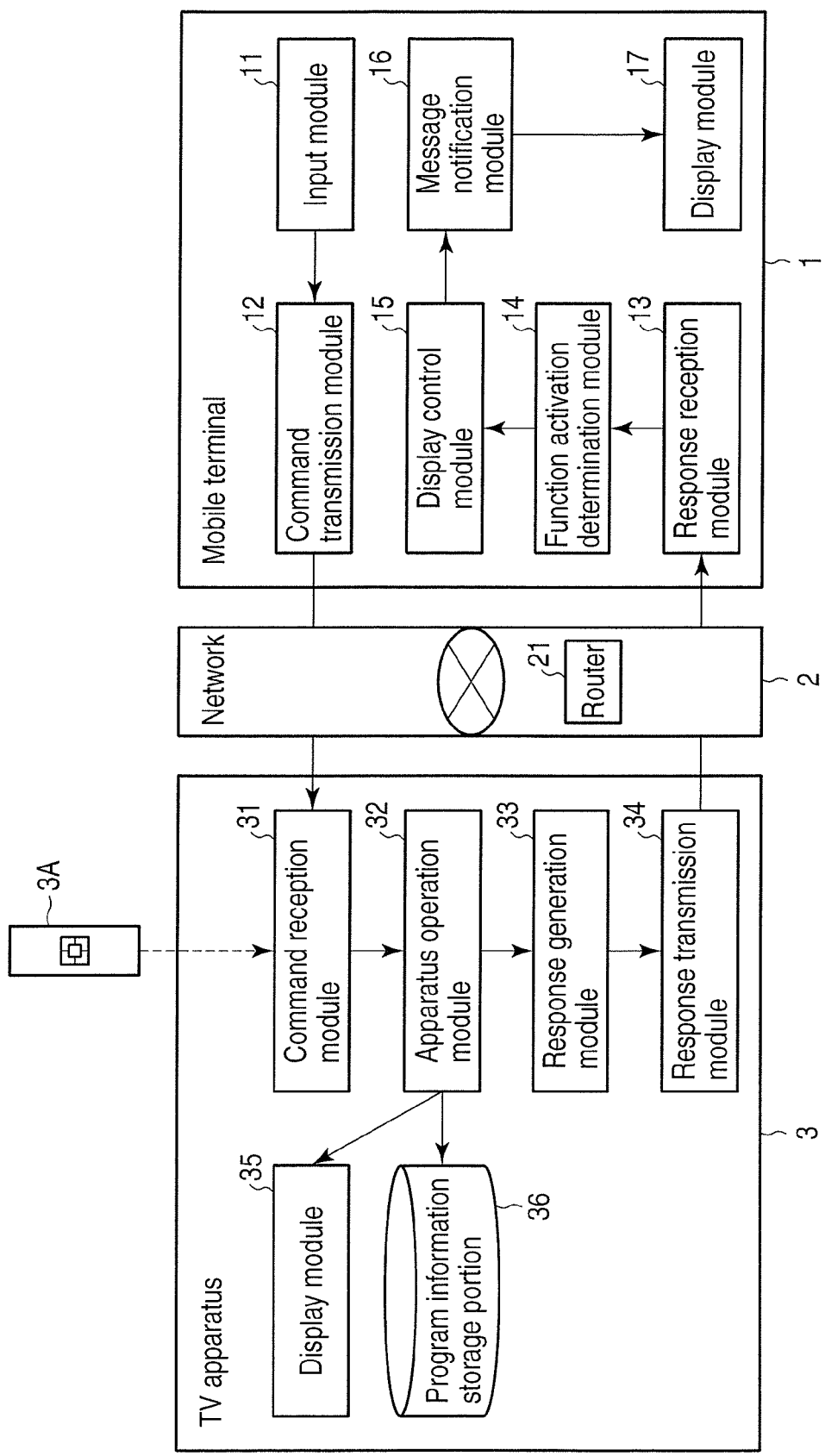
F I G. 1

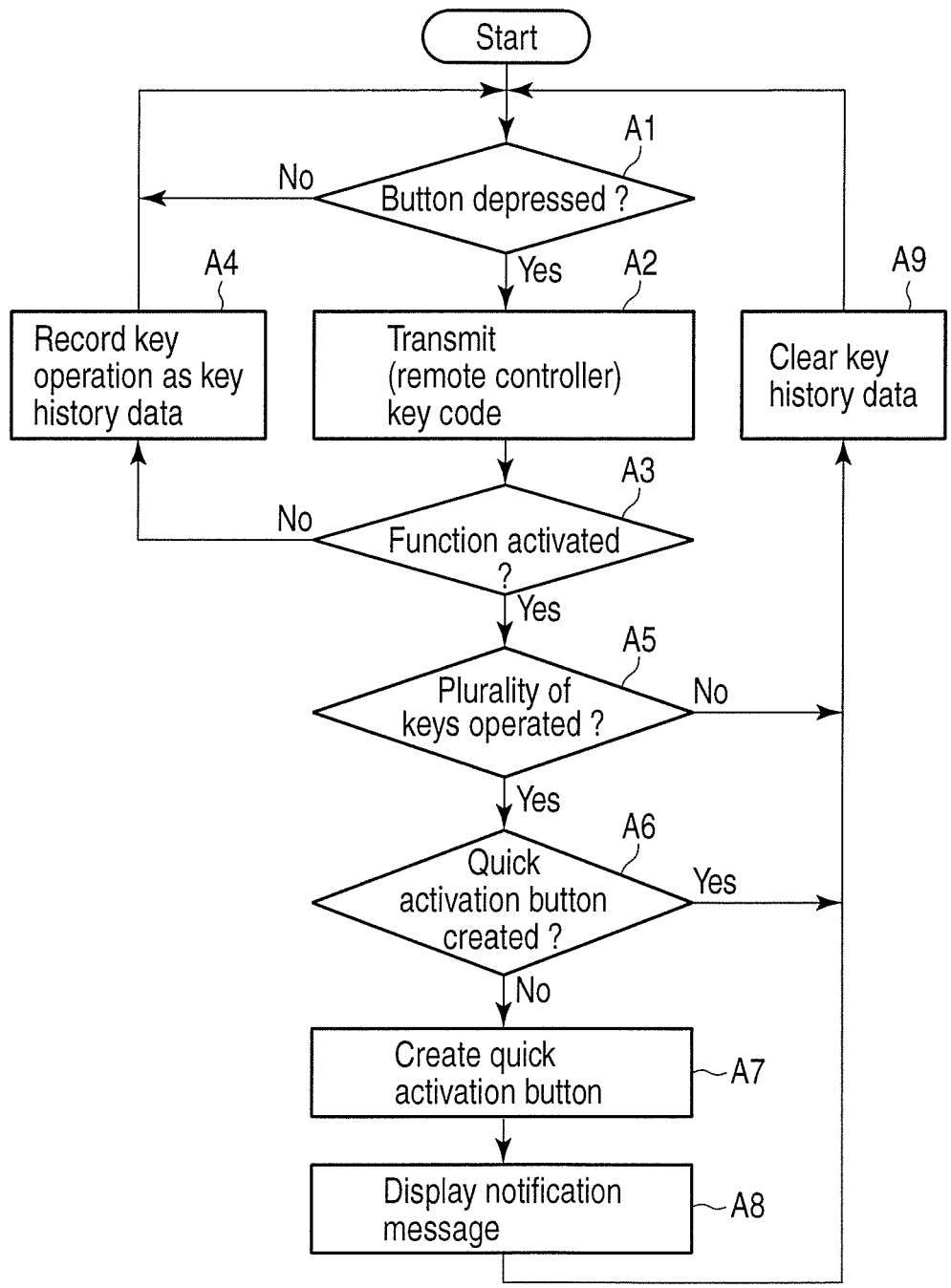
F I G. 7

ELECTRONIC APPARATUS AND METHOD FOR ASSISTING IN REMOTE CONTROL

CROSS-REFERENCE TO RELATED APPLICATIONS

This application is based upon and claims the benefit of priority from Japanese Patent Application No. 2010-168525, filed Jul. 27, 2010; the entire contents of which are incorporated herein by reference.

FIELD

Embodiments described herein relate generally to an electronic apparatus, for example, a mobile phone, and a method for assisting the electronic apparatus in remotely controlling another electronic apparatus, for example, a television receiver.

BACKGROUND

In recent years, a television receiver, a recording and reproducing apparatus, a personal computer, and the like have often been connected together via a network to construct a network environment in which, for example, the personal computer can remotely control the television receiver and the recording and reproducing apparatus. When such a network environment called, for example, a home network, is constructed, a user can use a personal computer carried by the user, even from outside the home to perform an operation for newly reserving programmed recording or changing or deleting the programmed recording in the recording and reproducing apparatus via the Internet.

Furthermore, sophisticated mobile phone models have recently prevailed widely which provide a browser function to allow Web pages to be browsed, a player function to allow music data and motion picture data to be reproduced, a TV function to allow one-segment broadcasting to be viewed, and the like. Mobile phones have also been significantly improved in operability owing to, for example, a touch panel mounted in the mobile phone so as to overlap a display. Thus, there has been a growing demand to operate a television receiver and a recording and reproducing apparatus using a mobile phone instead of remote controllers attached to the television receiver and the recording and reproducing apparatus.

Furthermore, the remote controllers attached to the television receiver and the recording and reproducing apparatus include fixedly arranged operation buttons. In contrast, the mobile phone with the touch panel mounted therein so as to overlap the display enables the arrangement of operation buttons (which are shown on the display) to be dynamically controlled. Thus, to utilize this characteristic to allow the television receiver and the recording and reproducing apparatus to be remotely controlled, a mechanism has been desired to be provided which allows the arrangement of the operation buttons to be adaptively customized depending on, for example, each user's operational status.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is an exemplary diagram schematically showing the configuration of a network system to which an electronic apparatus according to an embodiment is applied.

FIG. 7 is an exemplary flowchart showing an operational procedure for assisting in remote control performed by the electronic apparatus according to the embodiment.

DETAILED DESCRIPTION

Figure 2:
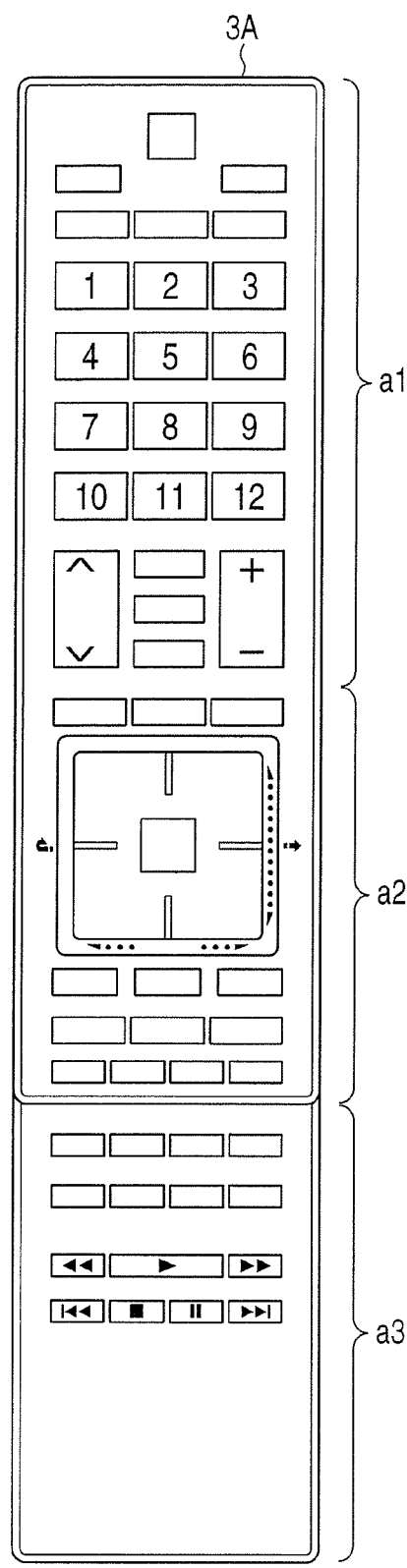
FIG. 2 is an exemplary diagram showing the appearance of a remote controller attached to another electronic apparatus remotely controlled by the electronic apparatus according to the embodiment.

Various embodiments will be described hereinafter with reference to the accompanying drawings.

In general, according to one embodiment, an electronic apparatus includes a display, an input module, a display controller, a communication module and a determination module. The display controller is configured to display an operation screen on the display. The operation screen is used for operating another electronic apparatus. The communication module is configured to transmit an operation signal to the another electronic apparatus. The operation signal indicates an operation of the input module operated in accordance with the operation screen. The determination module is configured to determine that a function of the another electronic apparatus is activated in response to transmission of the operation signal by the communication module. The display controller includes an object generation module. The object generation module is configured to generate an object representing an operation button for activating a function of the another electronic apparatus with one operation of the input module and to arrange the generated object on the operation screen, when the determination module determines that the function is activated through a plurality of operations of the input module.

(First Embodiment) . . . Configuration of Only a Remote Controller

<Configuration of a Mobile Terminal 1 According to a First Embodiment>

FIG. 1 is an exemplary diagram schematically showing the configuration of a network system to which an electronic apparatus according to the present embodiment is applied. The electronic apparatus according to the present embodiment is implemented as a mobile terminal 1, for example, a mobile phone.

As shown in FIG. 1, the mobile terminal 1 is connected to a television receiver (TV apparatus) 3 via a network 2. Various electronic apparatuses such as a recording and reproducing apparatus can be connected to the network 2. However, to make the description easily understood, it is assumed that a network system is formed of the mobile terminal 1, network 2, and TV apparatus shown in FIG. 1.

The mobile terminal 1 includes a wireless local area network (LAN) function in addition to a communication function carried out using a telephone network provided by a mobile phone provider. The mobile terminal 1 thus performs wireless communication complying with, for example, IEEE 802.11x standards, with a router 21. The network 2 is a wired LAN complying with, for example, Ethernet (registered trademark) standards. The router 21 is a device configured to relay communication between two networks (here, a wireless LAN and a wired LAN). The mobile terminal 1 is connected to the network 2 via the router 21.

Furthermore, the mobile terminal 1 provides a function to remotely control the TV apparatus 3 connected to the mobile terminal 1 via the network 2. In other words, the TV apparatus 3 provides a function to receive an operational instruction from the mobile terminal 1 connected to the TV apparatus 3 via the network 2. The electronic apparatus according to the embodiment, that is, the mobile terminal 1, includes a mechanism for providing a user interface that assists in efficiently remotely controlling the TV apparatus 3.

<Process Procedure Carried Out by the Mobile Terminal 1 According to the First Embodiment>

As described above, various electronic apparatuses such as a recording and reproducing apparatus can be connected to the network 2. The mobile terminal 1 can remotely control not only the TV apparatus 3 illustrated herein but also various electronic apparatuses such as a recording and reproducing apparatus which are connected to the mobile terminal 1 via the network 1.

As shown in FIG. 1, the mobile terminal 1 includes an input module 11, a command transmission module 12, a response reception section 13, a function activation determination module 14, a display control module 15, a message notification module 16, and a display module 17. The mobile terminal 1 includes a processor and a memory device mounted therein. The function activation determination module 14, the display control module 15, and the message notification module 16 are software modules implemented by a processor by executing corresponding programs stored in the memory device. Furthermore, the mobile terminal 1 is generally controlled by a software module.

The input module 11 includes a touch panel. The display module 17 includes a liquid crystal display (LCD). The touch panel of the input module 11 is provided so as to overlap LCD of the display module 17. The mobile terminal 1 displays operation screens on the display module 17. The mobile terminal 1 allows the input module 11 to detect operations performed on the operation screen. To remotely control the TV apparatus 3, the mobile terminal 1 displays an operation screen for the TV apparatus 3 on the display module 17. More specifically, for example, the mobile terminal 1 displays an operation screen that mimics an operation surface of a remote controller 3A attached to the TV apparatus 3. An example of this operation screen will be described below.

In the mobile terminal 1, the display module 17 and the input module 11 cooperates with each other in accepting a user's operation. The mobile terminal 1 then allows a command transmission module 12 to transmit an operation signal (a key code of the remote controller 3A) corresponding to the operation, to the TV apparatus 3 via the network 2. Each of the command transmission module 12 and the command reception module 13 includes a wireless communication module configured to perform wireless communication complying with, for example, IEEE 802.11x standards described above. The response reception module 13 is a data processing portion configured to receive various response signals from the TV apparatus 3, for example, when the TV apparatus 3 performs a certain operation in response to an operation signal transmitted by the command transmission module 12 and then returns a status signal indicative of the result of the operation.

<Configuration of the TV Apparatus 3 According to the First Embodiment>

Now, a configuration of the TV apparatus 3 which accepts operational instructions from the mobile terminal 1 via the network 2 will be described in brief.

As shown in FIG. 1, the TV apparatus 3 includes a command reception module 31, an apparatus operation module 32, a response generation module 33, a response generation module 34, a display module 35, and a program information storage portion 36.

The command reception module 31 receives key codes transmitted by the remote controller 3A attached to the TV apparatus 3 or key codes transmitted by the mobile terminal 1 via the network 2. Each of the command reception module 31 and the response transmission module 34 includes a wired communication module configured to perform wired communication complying with, for example, IEEE 802.3 standards. Furthermore, the command reception module 31 further includes a light receiving element configured to receive, for example, infrared light output by the remote controller 3A.

<Process Procedure Carried Out by the TV Apparatus 3 According to the First Embodiment>

The apparatus operation module 32 controls the operation of the whole TV apparatus 3 based on a key code received by the command reception module 31. For example, the apparatus operation module 32 controls the operation of the TV apparatus 3 such that the TV apparatus 3 receives and displays television program data for a specified channel on the display module 35 or displays a digital program table on the display module 35. The display module 35 includes, for example, LCD or plasma display panel (PDP). The TV apparatus 3 may provide a programmed recording function to allow television broadcasting data to be recorded and reproduced. Television broadcasting program data recorded by the programmed recording function is stored in the program information storage portion 36. The program information storage portion 36 includes, for example, a hard disk drive (HDD). The digital program table is service information periodically broadcast at predetermined timings. The digital program table is also stored in the program information storage portion 36.

The response generation module 33 returns a status signal to the mobile terminal 1 via the response transmission module 34 over the network 2; the status signal is indicative of the result of execution of an operation by the apparatus operation module 32 based on the key code received by the command reception module 31. This determination result and the like are received by the response reception module 13 of the mobile phone 1 as the above-described various response signals.

<Process Procedure in which the TV Apparatus 3 is Operated Via the Mobile Terminal 1 Through One Key Operation>

Now, a process procedure will be described which is carried out by the function activation determination module 14, display module 15, and message notification module 16 of the mobile terminal 1, which remotely controls the TV apparatus 3 configured as described above, via the network 2.

FIG. 2 shows the appearance of the remote controller 3A attached to the TV apparatus.

Figure 3:
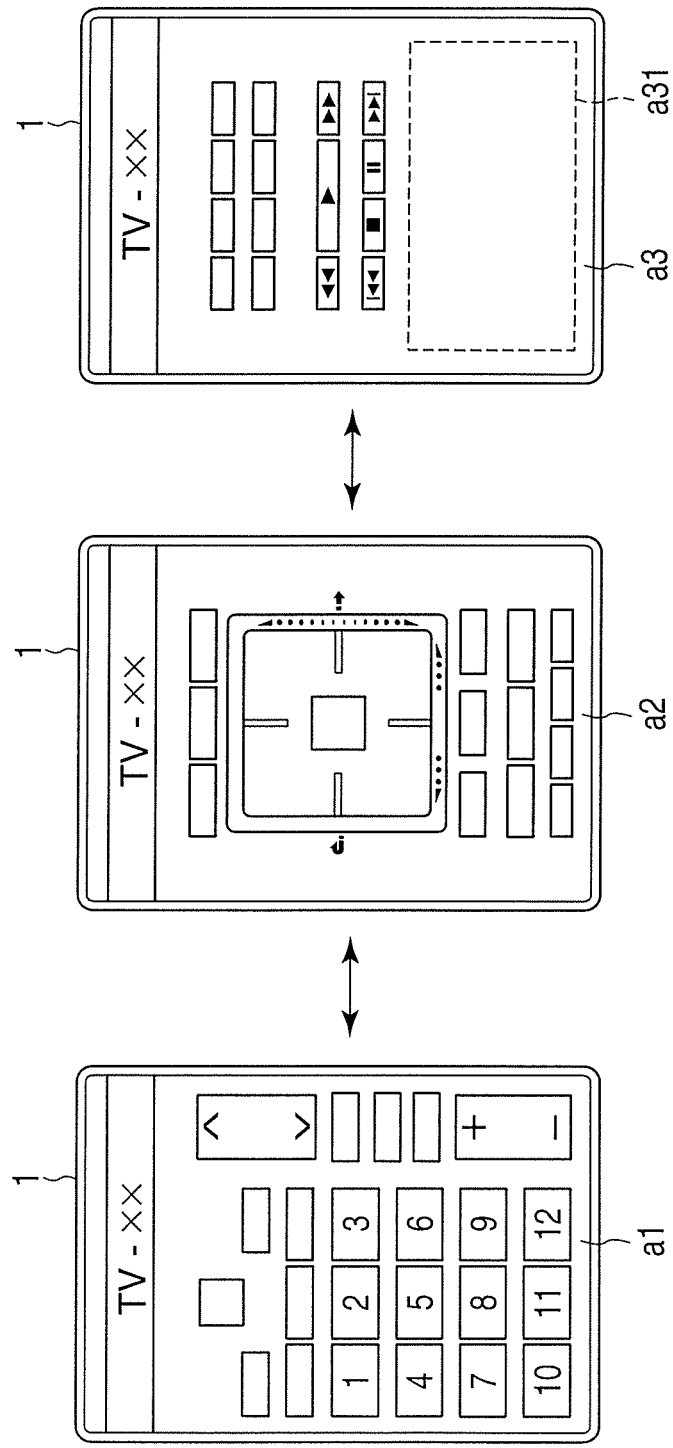
FIG. 3 is an exemplary diagram showing an example of an operation screen displayed by the electronic apparatus according to the embodiment.

As described above, to remotely control the TV apparatus 3, the mobile terminal 1 displays the operation screen mimicking the operation surface of the remote controller 3A. However, the display module 17 mounted in the mobile terminal 1 is limited in size. Thus, in the mobile terminal 1, the operation surface of the remote controller 3A is divided into three portions ("a1", "a2" and "a3" in FIG. 3). As shown in FIG. 3, operation screens "a1", "a2" and "a3" resulting from the division are switched during display.

For example, to start remote control of the TV apparatus 3, the mobile terminal 1 displays operation screen "a1" on the display module 17 as a top screen. When, for example, an operation of pressing a "power" button (object) by the finger or the like is performed on operation screen "a1", the operation is detected by the input module 11. Subsequently, the command transmission module 12 transmits the key code corresponding to the "power" button to the TV apparatus 3. As a result, the TV apparatus 3 is powered on and off. The operation of depressing any button on the operation screen displayed on the display module 17 may be hereinafter referred to as a key operation.

In contrast, when, for example, a sliding operation of drawing a line from right to left by the finger or the like is performed on the operation screen "a1", the mobile terminal 1 interprets that the user has instructed the mobile terminal to switch from operation screen "a1" to operation screen "a2" (instead of performing an operation of depressing any button). The mobile terminal 1 then displays operation screen "a2" on the display module 17 instead of operation screen "a1". Similarly, when, for example, a sliding operation of drawing a line from right to left by the finger or the like is performed on operation screen "a2", the mobile terminal 1 switches the display so as to proceed further from operation screen "a2" to operation screen "a3".

In contrast, when, for example, a sliding operation of drawing a line from left to right by the finger or the like is performed on operation screen "a2", the mobile terminal 1 switches the display so as to return from operation screen "a2" to operation screen "a1". In such a procedure, the mobile terminal 1 displays the operation screen mimicking the operation surface of the remote controller 3A and allowing the TV apparatus to be remotely controlled.

<Process Procedure in which the TV Apparatus 3 is Operated Via the Mobile Terminal 1 Through a Plurality of Key Operations>

The above-described "power" button allows the TV apparatus 3 to be powered on and off through one key operation. That is, a power management function of the TV apparatus 3 can be activated through one key operation. In contrast, some functions require a plurality of depressing operations for activating. More specifically, some functions can be activated as follows. When a certain button on the remote controller 3A is depressed, the corresponding operation screen is displayed on the display section of the TV apparatus 3. Then, while viewing the operation screen, the user depresses another relevant button on the remote controller 3A to activate the function.

Thus, when the user activates any function of the TV apparatus 3 through a plurality of key operations, the function activation determination module 14 and the display control module 15 generate a button configured to allow the function to be activated through one key operation. The generated button is placed, for example, in an area "a31" previously provided on operation screen "a3" in FIG. 3 as an area for button addition. Furthermore, the message notification module 16 displays, on the display module 17, a message notifying the user that the newly added button allows the current function activated through a plurality of key operations to be activated through one key operation.

Thus, the remote control using the mobile terminal 1 enables activating, through one key operation, of the function otherwise requiring a plurality of key operations for activating in the conventional remote control using the remote controller 3A attached to the TV apparatus 3. Furthermore, (quick launch) buttons for all the functions can be initially displayed. However, this is complicated and may degrade usability. In contrast, the mobile terminal 1 adds (quick launch) buttons only for functions actually utilized by the user, allowing the button arrangement to be customized depending on the user's operational status.

Figure 4A:
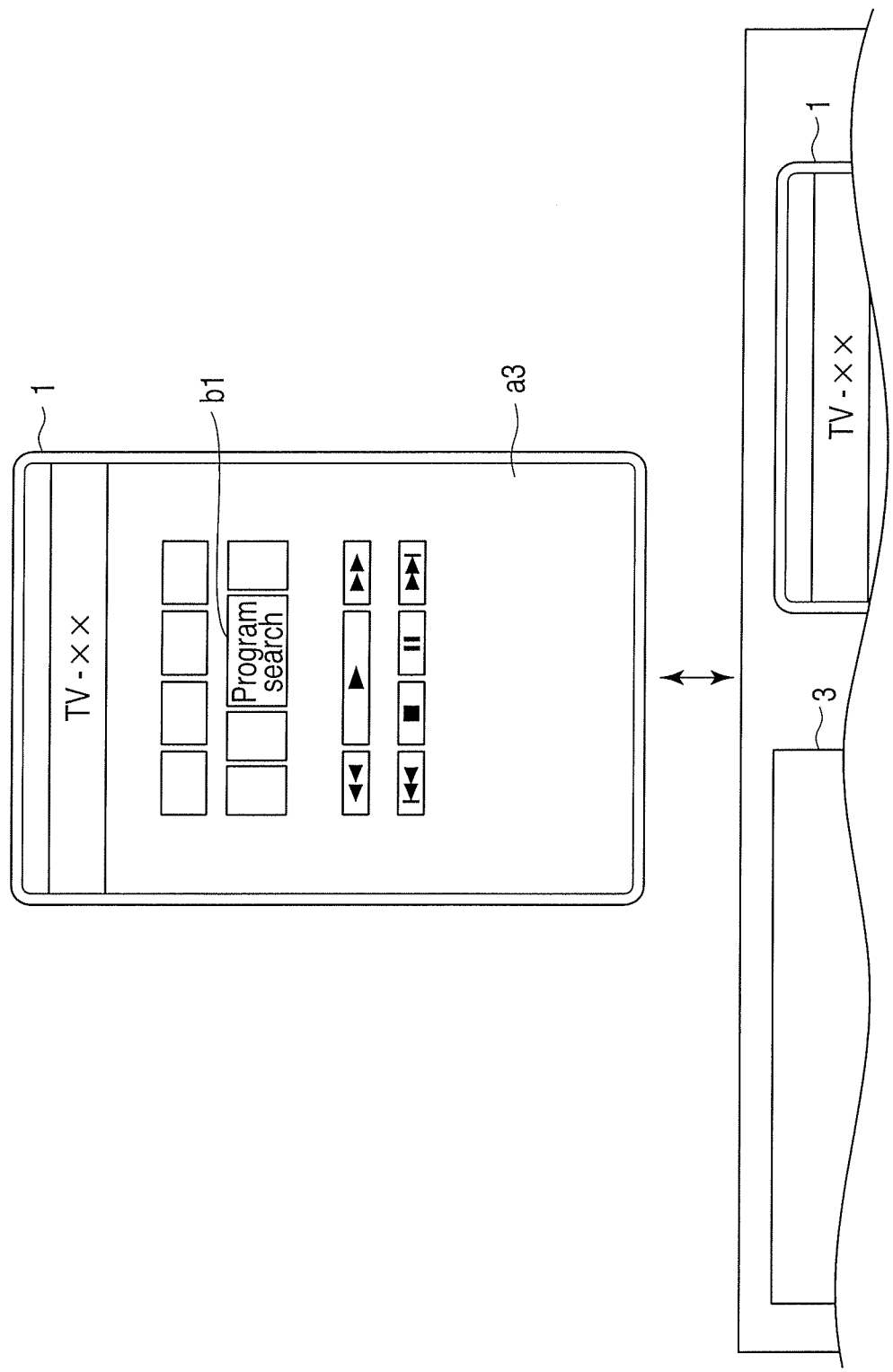
FIG. 4A is an exemplary first diagram illustrating an example of a procedure in which another electronic apparatus is remotely controlled by the electronic apparatus according to the embodiment.
Figure 4B:
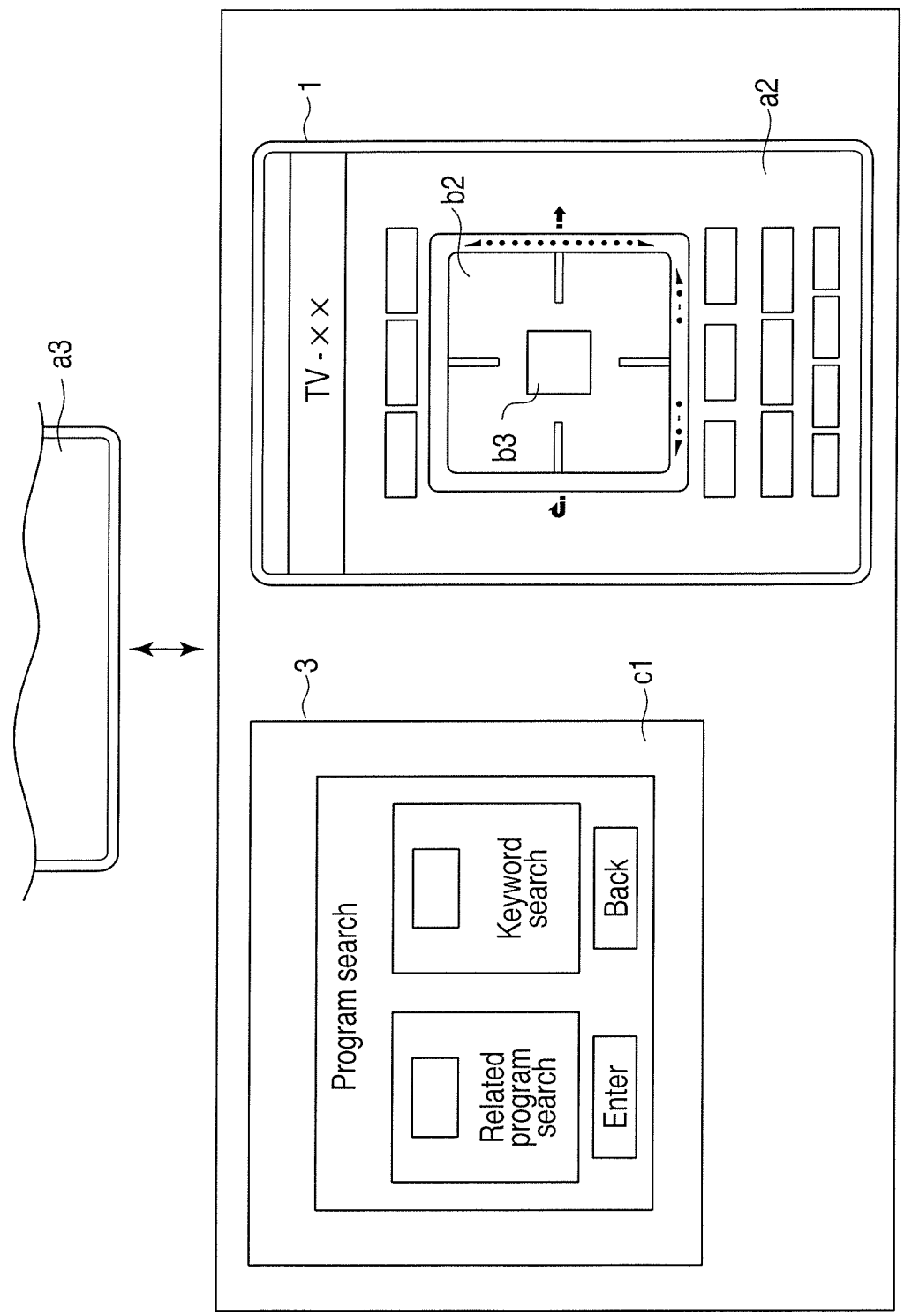
FIG. 4B is an exemplary second diagram illustrating an example of a procedure in which another electronic apparatus is remotely controlled by the electronic apparatus according to the embodiment.
Figure 4C:
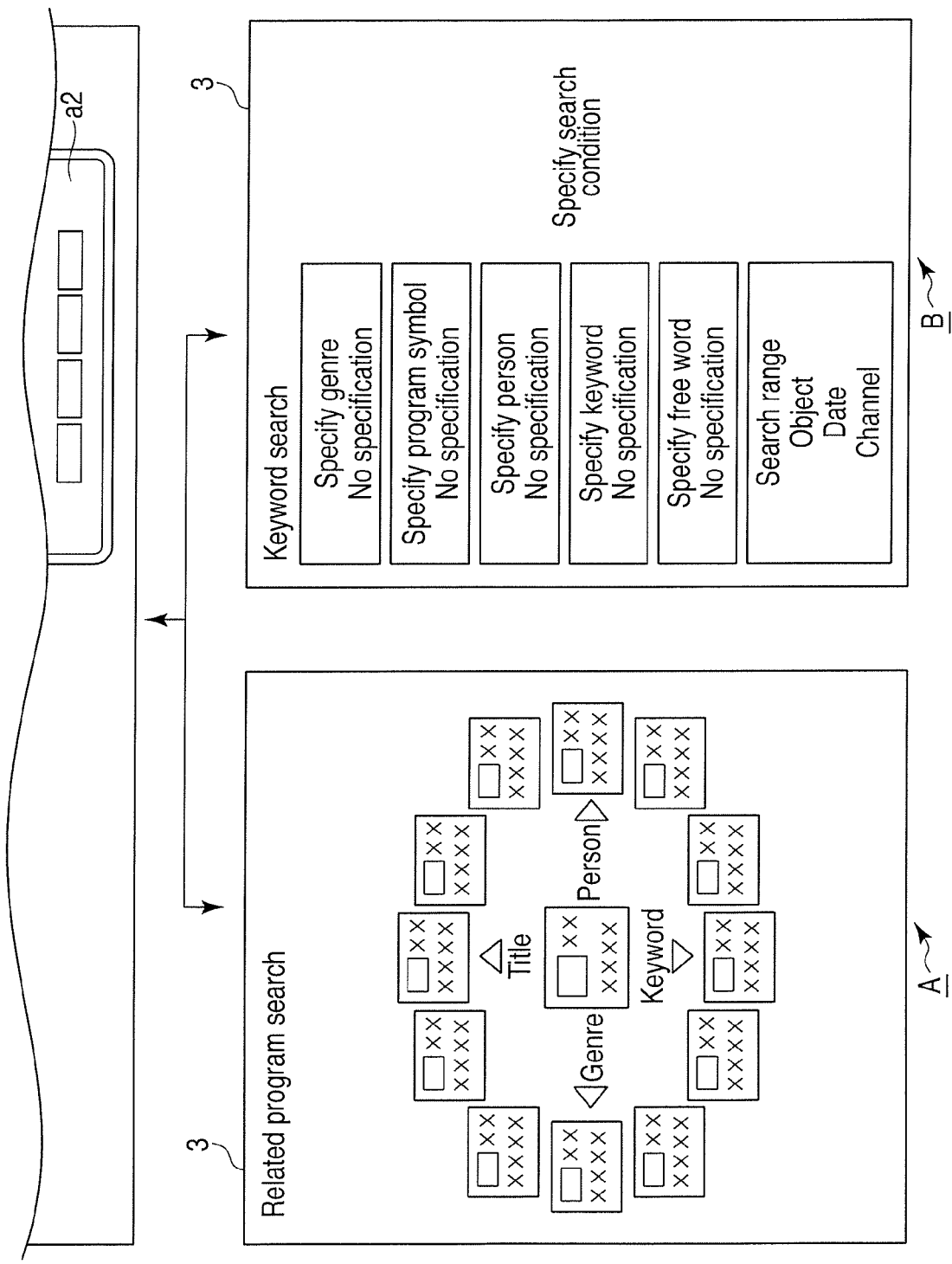
FIG. 4C is an exemplary third diagram illustrating an example of a procedure in which another electronic apparatus is remotely controlled by the electronic apparatus according to the embodiment.

A specific example will be described below. For example, it is assumed that the user desires to search program data being broadcast or recorded program data for program data to be viewed. The TV apparatus 3 provides two types of program search functions (related program search and keyword search) to allow a plurality of program data to be searched for the desired program data. With reference to FIG. 4A, FIG. 4B and FIG. 4C, a normal operational procedure for activating the program search functions will be described.

To activate the program search functions of TV apparatus 3, the user first depresses a "program search" button "b1" on operation screen "a3" (shown in FIG. 4A). Then, the key code corresponding to the "program search" button "b1" is transmitted to the TV apparatus 3. The TV apparatus 3 displays, on the display module 35, an operation screen "c1" allowing the user to select one of the "related program search" and the "keyword search" (shown in FIG. 4B).

The "related program search" is a function allowing programs related to the program data being viewed, which corresponds to a program of interest. The program of interest is displayed in the center of the display module 35 of the TV apparatus 3. Programs related to the corresponding genre are radially displayed in the left of the display module 35. Programs related to the corresponding person are radially displayed in the right of the display module 35. Programs related to the corresponding program name are radially displayed in the upper part of the display module 35. Programs related to the corresponding keyword other than the person are radially displayed in the lower part of the display module 35. Any of the displayed programs may be selected. Alternatively, search of the related programs may further be continued by switching the program of interest to any of the related programs displayed around the program of interest.

In contrast, "keyword search" is a function to allow any program to be searched for by setting a search condition such as the genre or the person. Programs matching the search condition are displayed as search results. Then, a program to be viewed may be selected from the displayed programs. Re-search is carried out by re-setting the search condition.

The user views operation screen "c1" displayed on the display module 35 of the TV apparatus 3. Then, if the user is to select the "related program search", the user allows the operation screen (shown in FIG. 4B) to be displayed on the display module 17 of the mobile terminal 1. First, the user depresses the left side of a "direction" button "b2" on operation screen "a2" to allow the "related program search" to be selected. Then, the user depresses an "Enter" button "b3" on operation screen "a2" to activate the "related program search" (shown in "A" in FIG. 4C). Similarly, if the user is to select the "keyword search", the user depresses the right side of the "direction" button "b2" on operation screen "a2" and then the "Enter" button to activate the "keyword search" (shown in "B" in FIG. 4C).

As described above, to activate the "related program search" (program search function), the user needs to perform three key operations on the "program search" button "b1", the "direction (left)" button "b2", and the "Enter" button "b3". To activate the "keyword search" (program search function), the user also needs to perform three key operations on the "program search" button "b1", the "direction (right)" button "b2", and the "Enter" button "b3".

Figure 5:
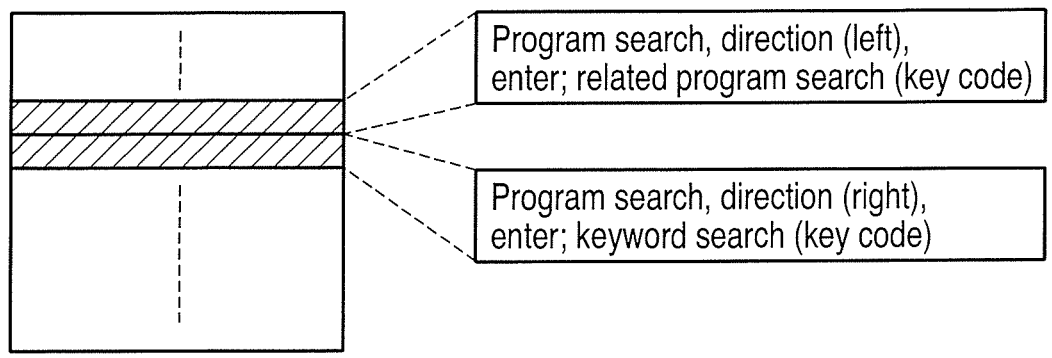
FIG. 5 is an exemplary diagram showing an example of an operation table managed by the electronic apparatus according to the embodiment.

The function activation determination module 14 provides a function to manage an operation table that holds operation procedures each for activating a corresponding one of all the functions of the TV apparatus 3. FIG. 5 is an exemplary diagram showing an example of the operation table.

As shown in FIG. 5, referencing of the operation table allows the terminal 1 to determine that the "related program search" (program search function) has been activated when key operations are performed on the "program search" button "b1", the "direction (left)" button "b2", and the "Enter" button "b3" in this order. Similarly, the terminal 1 can determine that the "keyword search" (program search function) has been activated when key operations are performed on the "program search" button "b1", the "direction (right)" button "b2", and the "Enter" button "b3" in this order. The operation table also holds key codes for giving direct instructions to activate the respective functions.

Furthermore, second, the function activation determination module 14 provides a function to manage the history of key operations. Every time a key operation is performed, the function activation determination module 14 records the key operation as history data. The function activation determination module 14 searches the operation table to determine whether or not any of the procedures hitherto recorded as history data matches the key operation. Then, when any procedure matches the key operation, the function activation determination module 14 determines that the corresponding function has been activated. If the procedure includes at least two key operations, the function activation determination module 14 determines that a button is to be created which allows the function to be activated through one key operation.

When key operations are performed on the above-described "program search" button "b1", the "direction (left)" button "b2", and the "Enter" button "b3" in this order, the function activation determination module 14 determines that a button is to be created which allows the "related program search" (program search function) to be activated through one key operation. The function activation determination module 14 then notifies the display control module 15 that the button is to be created.

Figure 6:
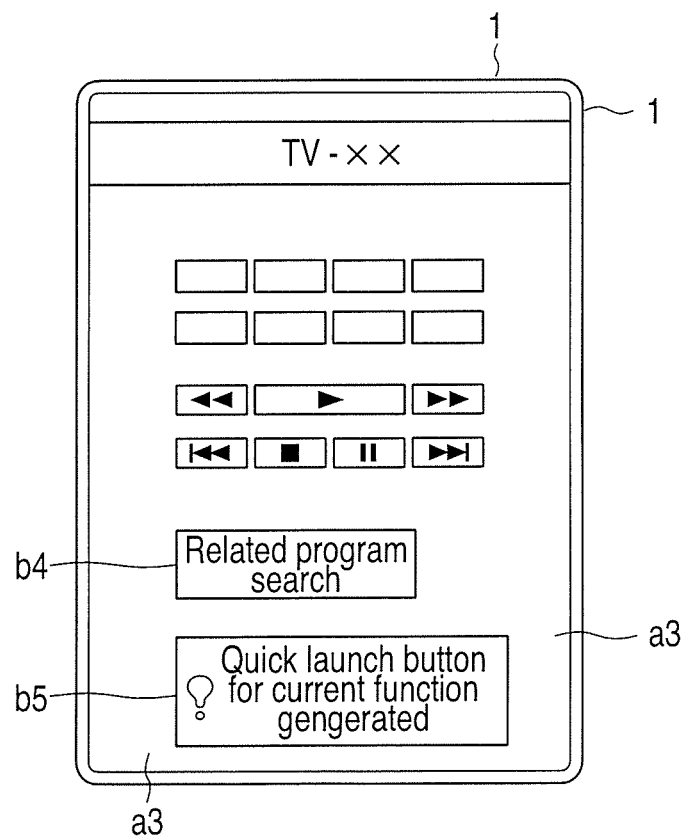
FIG. 6 is an exemplary diagram showing an example of customization of an operation screen carried out by the electronic apparatus according to the embodiment.

Upon receiving this notification, the display control module 15 creates a button for the "related program search" (program search function) and places the button in an area "a31" on operation screen "a3" ("related program search" button "b4"), as shown in FIG. 6. If the "related program search" button "b4" is depressed, the display control module 15 makes setting such that a key code for the "related program search" held in the operation table is transmitted to the TV apparatus 3. Furthermore, upon adding a new button, the display control module 15 notifies the message notification module 16 that the new button has been added. Upon receiving this notification, the message notification module 16 displays, on the display module 17, a message "b5" informing the user that the button has been added which allows the function activated by the user through a plurality of key operations to be activated through one key operation, as shown in FIG. 6.

Thus, the user who has utilized the "related program search" (program search function) can subsequently activate the "related program search" (program search function) simply by depressing the "related program search" button "b4" on operation screen "a3" once. Of course, the "related program search" button "b4" is not added to operation screen "a3" of users who have not utilized the "related program search" (program search function). For such users, buttons are added which allow functions mainly utilized by the users to be activated through one key operation. That is, a mechanism is implemented which allows the arrangement of the operation buttons to be customized depending on each user's operational status.

<Flowchart of the First Embodiment>

FIG. 7 is an exemplary flowchart showing an operational procedure for assisting in the remote control performed by the mobile terminal 1.

The mobile terminal 1 monitors the buttons to determine whether or not any of the buttons has been depressed (block A1). If any of the buttons is depressed (Yes in block A1), the mobile terminal 1 transmits the key code corresponding to the key to the TV apparatus 3 (block A2). The mobile terminal 1 checks whether or not any of the functions in the TV apparatus 3 has been activated by the key operation (block A3). Upon determining that none of the functions have been activated (NO in block A3), the mobile terminal 1 records the key operation as history data (block A4). In this case, the mobile terminal 1 returns to block A1 to monitor the buttons to determine whether or not any of the buttons has been depressed.

In contrast, upon determining that any of the functions has been activated (YES in block A3), the mobile terminal 1 first checks whether or not the function has been activated through a plurality of key operations (block A5). If the function has been activated through a plurality of key operations (YES in block A5), the mobile terminal 1 subsequently checks whether or not a button (quick activation button) has already been created which allows the function to be activated though one key operation (block A6). This is carried out, for example, in the above-described example, taking the following into account: even after the "related program search" button "b4" is created, the "related program search" (program search function) may be activated in the normal procedure using the "program search" button "b1", the "direction (left)" button "b2", and the "Enter" button "b3".

A button for the function has not been created (YES in block A6), the mobile terminal 1 creates a button for the function (block A7). The mobile terminal 1 further displays a message informing the user that the button has been created (block A8). After the quick activation button is created and the message is displayed, the mobile terminal 1 deletes the key operation hitherto recorded as history data (block A9). The mobile terminal 1 returns to block A1 to monitor the buttons to determine whether or not any of the buttons has been depressed.

Furthermore, if the function has not been activated through a plurality of key operations (NO in block A5) or if the quick activation button has already been created (NO in block A6), the mobile terminal 1 does not create the quick activation button and carries out only deletion of the key history in block A9. The mobile terminal 1 then returns to block A1 to monitor the buttons to determine whether or not any of the buttons has been depressed. That is, the mobile terminal 1 deletes the key operations at a timing when any of the functions in the TV apparatus 3 has been activated. In other words, for the key history, a series of key operations for one function, that is, the key operations performed until any of the functions is activated, are recorded.

Here, the procedure has been illustrated in which in response to the user activating any of the functions of the TV apparatus 3 through a plurality of key operations, a quick activation button for the function is automatically created. In addition, the function activation determination module 14 may manageably determine how many times the function has been activated and automatically create a quick activation button for the function provided that the number of activating operations preformed has reached a preset value.

In the example illustrated in the above description, the mobile terminal 1 manages the operation table and the key operation history, and independently automatically creates a quick activation button.

(Second Embodiment) . . . Combination of a Television and an IP Remote Controller Now, an example will be described in which the remotely controlling mobile terminal 1 and the to-be-remotely-controlled TV apparatus 3 cooperate with each other in automatically creating a quick activation button in the mobile terminal 1.

Every time a key operation is performed on the mobile terminal 1, the key code corresponding to the key operation is transmitted to the TV apparatus 3. Thus, the TV apparatus 3 manages the transmitted key code as history data. When any of the functions in the TV apparatus 3 is activated, the TV apparatus 3 checks whether or not the function has been activated through a plurality of key operations. If the function has been activated through a plurality of key operations, the TV apparatus 3 transmits a key code instructing the mobile terminal 1 to activate the function, to the mobile terminal 1. When transmitting the key code to the mobile terminal 1, the TV apparatus 1 also transmits identification information (for example, text data indicative of "related program search") on the function activated by the key code.

In contrast, upon receiving the key code from the TV apparatus 3, the mobile terminal 1 checks whether or not the key code is an existing one. If the key code is not an existing one, the mobile terminal 1 creates a quick activation button allowing the key code to be transmitted, that is, allowing the current function activated through a plurality of key operations to be activated through one key operation. The mobile terminal 1 further displays a message informing the user that the quick activation button has been created.

<Flowchart of the Second Embodiment>

Figure 8:
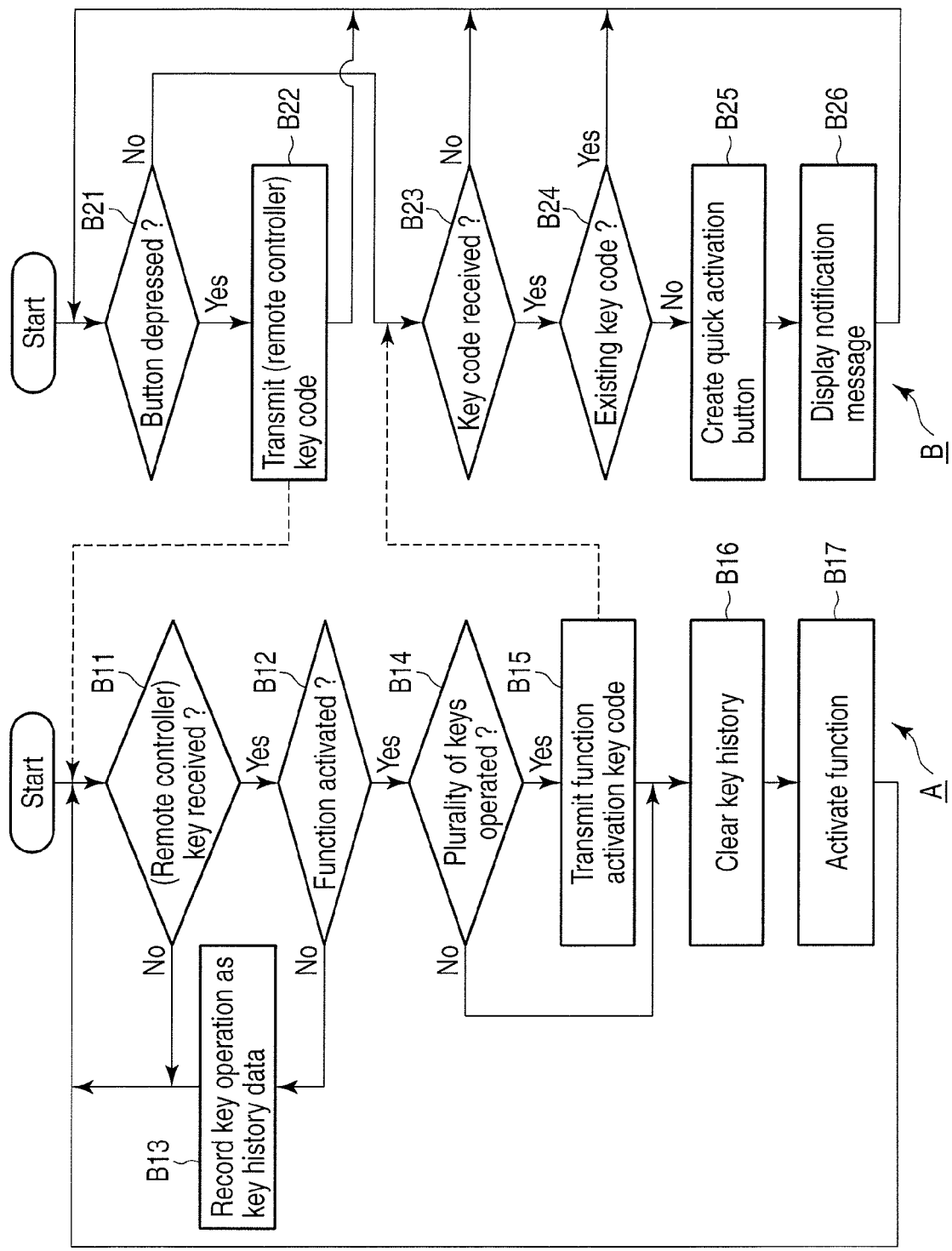
FIG. 8 is an exemplary flowchart showing operational procedures used when the electronic apparatus according to the embodiment and the to-be-remotely-controlled another electronic apparatus cooperate with each other in implementing remote control assistance.

FIG. 8 is an exemplary flowchart showing operational procedures for the mobile terminal 1 and the TV apparatus 3 which procedure is used when the mobile terminal 1 and the TV apparatus 3 cooperate with each other in remote control assistance.

"A" of FIG. 8 illustrates an operational procedure for the TV apparatus 3. The TV apparatus 3 carries out monitoring to determine whether or not any key code has been received from the mobile terminal 1 (block B11). If any key code has been received from the mobile terminal 1 (YES in block B11), the TV apparatus 3 checks whether or not the reception of the key code activates any of the functions (block B12). Upon determining that the reception of the key code has not activated any of the functions (NO in block B12), the TV apparatus 3 records the key code as history data (block B13). In this case, the TV apparatus 3 returns to block B11 to determine whether or not any key code has been received from the mobile terminal 1.

In contrast, upon determining that the reception of the key code activates any of the functions (YES in block B12), the TV apparatus 3 subsequently checks whether or not the function has been activated trough a plurality of receptions of key codes (block B14). If the function has been activated through a plurality of receptions of key codes (YES in block B14), the TV apparatus 3 transmits a key code instructing the mobile terminal 1 to activate the function, to the mobile terminal 1 (block B15). If the function has not been activated through a plurality of receptions of key codes (NO in block B14), the TV apparatus 3 skips transmission of key codes in block B15.

Then, the TV apparatus 3 deletes the key codes hitherto recorded as history data (block B16), and activates the function (block B17). The TV apparatus 3 returns to block B11 to carry out monitoring to determine whether or not any key code has been received from the mobile terminal 1.

Furthermore, "B" of FIG. 8 illustrates an operational procedure for the mobile terminal 1. The mobile terminal 1 monitors the buttons to determine whether or not any of the buttons has been depressed (block B21). If any of the buttons has been depressed (YES in block B21), the mobile terminal 1 transmits the key code corresponding to the key, to the TV apparatus 3 (block B22). In this case, the mobile terminal1 returns to block B21 to monitor the buttons to determine whether or not any of the buttons has been depressed.

If none of the buttons have been depressed (NO in block B21), the mobile terminal 1 subsequently checks whether or not any key code has been received from the TV apparatus 3 (any key code transmitted by the TV apparatus 3 in block B15) (block B23). If any key code has been received (YES in block B23), the mobile terminal 1 subsequently checks whether or not the key code is an existing one (block B24).

If the key code is not an existing one (NO in block B24), the mobile terminal 1 creates a quick activation button allowing the key code to be transmitted (block B25). The mobile terminal 1 further displays a message informing the user that the quick activation button has been created (block B26). After the quick activation button is created and the message is displayed, the mobile terminal 1 returns to block B21 to monitor the buttons to determine whether or not any of the buttons has been depressed.

If no key code has been received (NO in block B23) or the key code is an existing one (YES in block B24), the mobile terminal 1 also returns to block B21 to monitor the buttons to determine whether or not any of the buttons has been depressed.

Thus, the cooperation between the remotely controlling mobile terminal 1 and the to-be-remotely-controlled TV apparatus 3 allows the mobile terminal 1 to automatically create a quick activation button.

As described above, the electronic apparatus according to the embodiments is assisted in efficiently remotely controlling another electronic apparatus.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
a display;
an input module;
a display controller configured to display an operation screen on the display, the operation screen being used for operating another electronic apparatus;
a communication module configured to transmit an operation signal to the another electronic apparatus, the operation signal indicating an operation of the operation screen displayed on the display; and
a determination module configured to determine that a function of the another electronic apparatus is activated in response to the operation from the communication module,
wherein the display controller comprises an object generation module configured to generate an object representing an operation button for activating a function of the another electronic apparatus with one operation and to arrange the generated object on the operation screen, when the determination module determines that the function is activated through a plurality of operations of the input module, and
the communication module is configured to transmit an operation signal for directly instructing the another electronic apparatus to activate a function to the another electronic apparatus, when the object generated by the object generation module and arranged on the operation screen is operated.

2. The apparatus of claim 1, wherein:
the determination module comprises:
a table management module configured to manage an operation table storing a correspondence relationship between each of functions of the another electronic apparatus and each of operational procedures for activating each of the functions; and
a history management module configured to manage history of operations of the operation screen, and
the determination module is configured to determine that a function associated with an operational procedure on the operation table is activated, when the operational procedure managed as the history of operations managed by the history management module exists in the operation table managed by the table management module.

3. The apparatus of claim 1, wherein:
the object generation module comprises an object management module configured to manage the generated object, and
the object generation module is configured to generate the object when the determination module determines that a function is activated and when the object for the function is not generated yet.

4. The apparatus of claim 3, wherein the object generation module is configured to generate the object for a function for which a number of times the function is determined by the determination module to be activated has reached a predetermined value.

5. The apparatus of claim 2, wherein the history management module is configured to delete the history of the managed operations when a function of the another electronic apparatus is activated.

6. The apparatus of claim 1, wherein the display controller further comprises a message display module configured to display a message informing that a function activated through a plurality of operations can be activated through one operation using a new object when the new object is generated.

7. The apparatus of claim 1, wherein:
the communication module is configured to receive the operation signal for directly instructing the another electronic apparatus to activate a function, the operation signal being transmitted from the another electronic apparatus when the another electronic apparatus activates the function upon receiving a plurality of operation signals, and
the object generation module is configured to generate the object for the function activated by the operation signal when the operation signal is received by the communication module and when the operation signal is not an existing operation signal in the apparatus.

8. The apparatus of claim 7, wherein the object generation module is configured to generate the object for a function for which the number of times the communication module receives the operation signal has reached a predetermined value.

9. The apparatus of claim 1, wherein the apparatus is connected to the another electronic apparatus via a network.

10. A method for assisting remote control by an electronic apparatus comprising a function to display an operation screen used for operating another electronic apparatus, the method comprising:
generating an object representing an operation button for activating a function of the another electronic apparatus with one operation when the function is activated through a plurality of operations, and arranging the generated object on the operation screen;
transmitting an operation signal for directly instructing the another electronic apparatus to activate a function to the another electronic apparatus, when the object arranged on the operation screen is operated; and
displaying a message informing that the function activated through the plurality of operations can be activated through one operation using a new object when the new object is generated.

11. A non-transitory computer readable medium having stored thereon a computer program which is executable by a computer comprising a function to display an operation screen used for operating another electronic apparatus, the computer program controlling the computer to execute functions of:
generating an object representing an operation button for activating a function of the another electronic apparatus with one operation when the function is activated through a plurality of operations, and arranging the generated object on the operation screen;
transmitting an operation signal for directly instructing the another electronic apparatus to activate a function to the another electronic apparatus, when the object generated by the object generation module and arranged on the operation screen is operated; and
displaying a message informing that the function activated through the plurality of operations can be activated through one operation using a new object when the new object is generated.

* * * * *